United States Patent [19]
Burrough et al.

[11] 4,257,219
[45] Mar. 24, 1981

[54] CYLINDRICAL BALE FORMING MACHINE HAVING HYDRAULIC CONTROL MEANS FOR CONTROLLING THE BALE DENSITY

[75] Inventors: Donald E. Burrough; Hallis D. Campbell; Dean E. Seefeld, all of West Bend, Wis.

[73] Assignee: Gehl Company, West Bend, Wis.

[21] Appl. No.: 69,997

[22] Filed: Aug. 27, 1979

[51] Int. Cl.³ .............................................. A01D 39/00
[52] U.S. Cl. ........................................ 56/341; 100/88
[58] Field of Search .................... 56/341, 343; 100/88, 100/76, 5

[56] References Cited
U.S. PATENT DOCUMENTS

| | | | |
|---|---|---|---|
| 3,722,197 | 3/1973 | Vermeer | 100/88 |
| 3,751,890 | 8/1973 | Gay et al. | 56/341 |

Primary Examiner—Jay N. Eskovitz
Attorney, Agent, or Firm—James E. Nilles

[57] ABSTRACT

A rotary baler for forming large cylindrical bales of cut crop material such as hay and which uses a conveyor belt and an oppositely moving compacting belt arrangement to rotate the hay and form the bale in a baling compartment. Adjustable hydraulic control means are provided for controlling the tension in the compacting belt to thereby control the density of the bale being formed. The hydraulic control means is such that a lower tension force is maintained in the compacting belts during the critical initial start-up phase, and a higher belt tension is provided during the early bale forming stage, resulting in a finished bale of high density.

13 Claims, 8 Drawing Figures

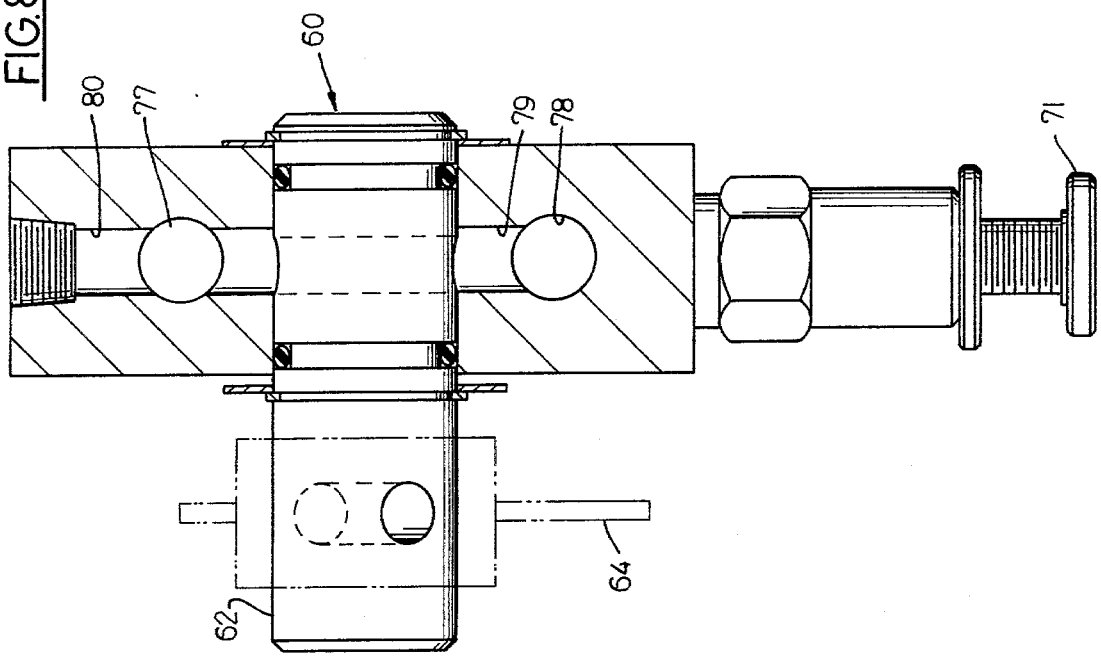
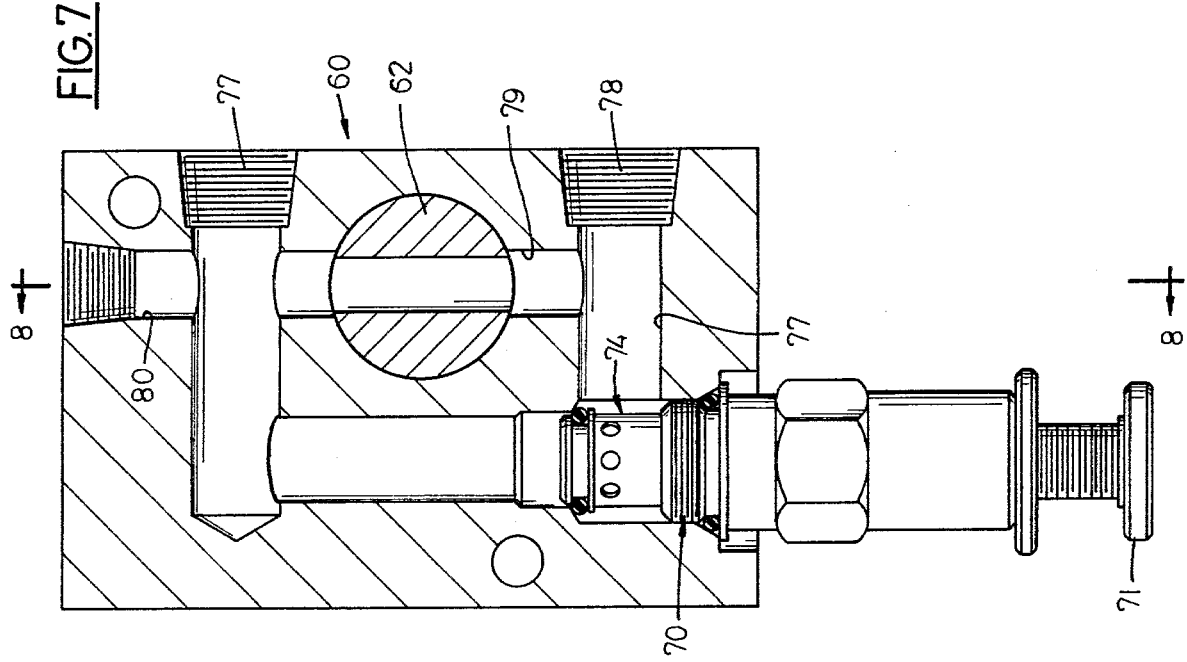

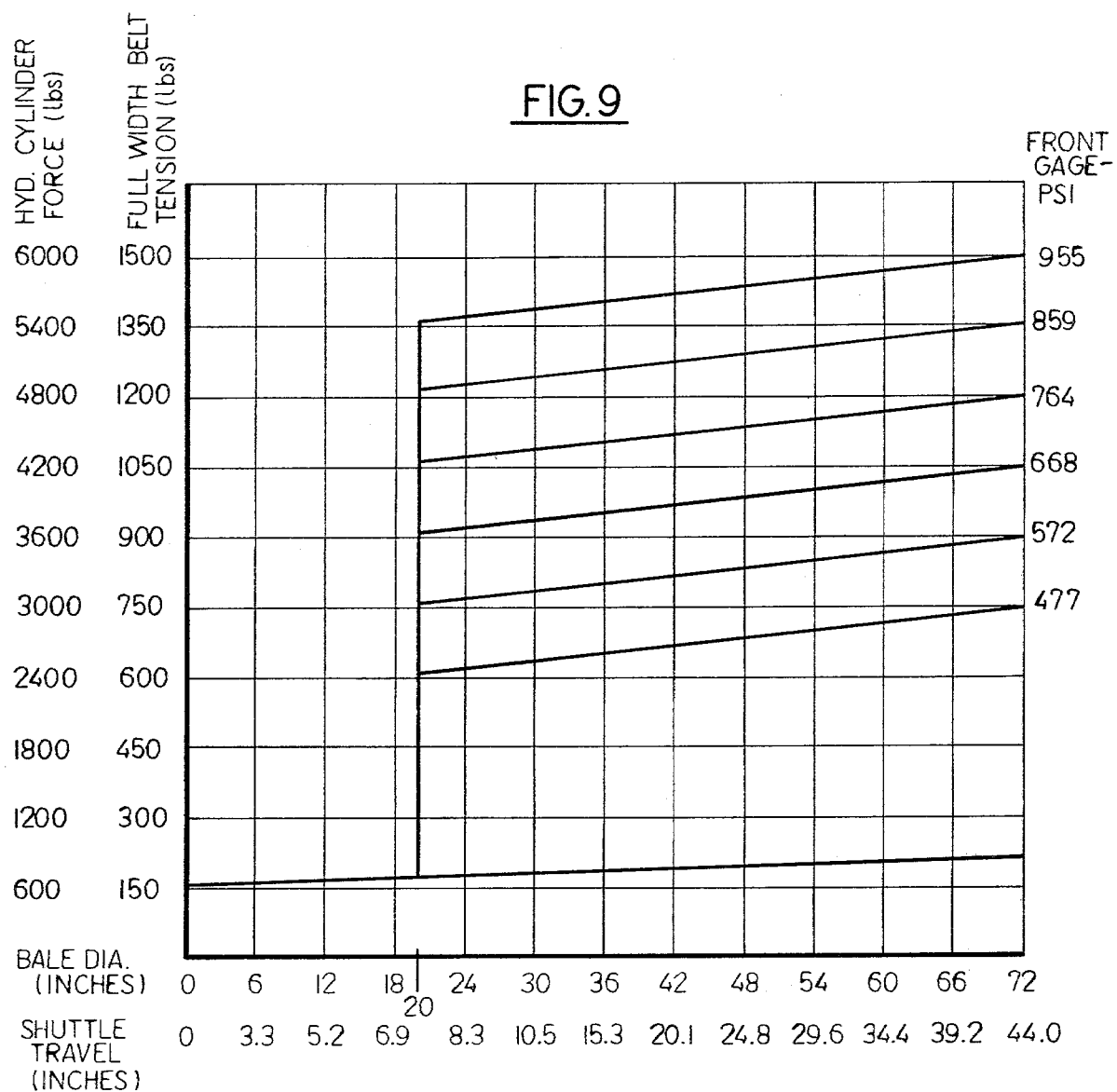

CYLINDRICAL BALE FORMING MACHINE HAVING HYDRAULIC CONTROL MEANS FOR CONTROLLING THE BALE DENSITY

BACKGROUND OF THE INVENTION

This invention relates generally to machines for forming cut crop into bales and, more particularly, into cylindrical bales, and is an improvement over prior art balers of the type which employ belts to rotate and compact a bale on a moving machine such as disclosed in the U.S. Pat. No. 3,914,926 issued Oct. 28, 1975 and assigned to an assignee common with the present application.

In such baling machines hay is received by the baler between a feed or packer roller and a conveyor belt and pressed into a flat, thin mass from which it passes to a core forming area where it is rolled between the conveyor belt and the flight of an oppositely moving belt arrangement. Thereafter, the thin mass of hay is rolled about the core into a bale which continues to increase in size until the desired size is achieved. During its formation, the bale is formed in a zone in which the bale is confined between the belts and the feeder roller.

The said prior art U.S. Pat. No. 3,914,926 utilizes large and expensive springs for maintaining tension in the compacting belt, which springs were not only expensive but required a large amount of space on the machine in order to accommodate their required size. These prior art devices furthermore would not provide for suitable adjustability of the bale tensioning mechanisms, nor provide varying tension to the compacting belt, either for various crop conditions or desired bale density, or for varying the pressure applied to the bale during different stages of bale formation.

SUMMARY OF THE INVENTION

The present invention provides a rotary crop baler for forming large cylindrical bales and which utilizes a lower conveyor acting in cooperation with a large compacting means that wraps around the bale being formed and is under proper tension to thereby control the bale density. More specifically, the present invention provides a baler of this type and which has hydraulic control means acting on the compacting means whereby a low tension is provided for the belts during the initial bale formation stages, and a high compacting belt tension while the rotating bale is relative small. The hydraulic control means can be adjusted as to the amount of tension imparted to the compacting means, and thereby increases the bale density over conventional belt tensioning means.

More specifically, the invention contemplates adjustable hydraulic valve means which is actuated by extensible hydraulic cylinders as the bale is being formed, the amount of extension of the cylinder being directly related to the bale size. When the bale has commenced rotation and reaches a predetermined size, the hydraulic control means is actuated and pressure fluid from extending hydraulic cylinders is forced through an adjustable relief valve at pressure higher than the initial pressure in the hydraulic reservoir.

The adjustable relief valve provides tension on the belts which can be varied to accurately and quickly vary bale density.

The hydraulic control mechanism can provide more compacting belt tension for a given amount of space on a baling machine than is possible with conventional bulky and expensive known tensioning means.

These and other objects and advantages of the present invention will appear hereinafter as this disclosure progresses, reference being had to the accompanying drawings.

BRIEF DESCRIPTION OF THE DRAWINGS

FIG. 7 is a cross-sectional view through the valve shown in the other figures, but on an enlarged scale;

FIG. 8 is a sectional view taken generally along the line 8—8 in FIG. 7; and

FIG. 9 is a graph showing the relationship between the bale diameter (shuttle travel) and the compacting belt tension (hydraulic cylinder force).

DESCRIPTION OF A PREFERRED EMBODIMENT

The present invention is an improvement over the subject matter of U.S. Pat. No. 3,914,926 which utilizes large tension springs for maintaining tension in the compacting belts. Much of the structure and operation of the device of the patent is similar to that of the present invention and a greatly detailed description of the baler is thereby deemed to be neither necessary nor desirable, but reference may be had to said patent if such is desired. It is believed sufficient to say for purposes of this disclosure that a cylindrical bale forming machine which embodies the present invention includes a mobile frame F which is supported in elevated and transportable position over the ground by the ground engaging wheels 1. A tongue structure (not shown) extends forwardly of the frame and has its forward end connected to a conventional towing vehicle, such as a tractor, not shown. Power is supplied to the baling machine from the power take-off shaft of the tractor and is adapted to be connected to the machine for operating various mechanisms thereof.

Figure 1:
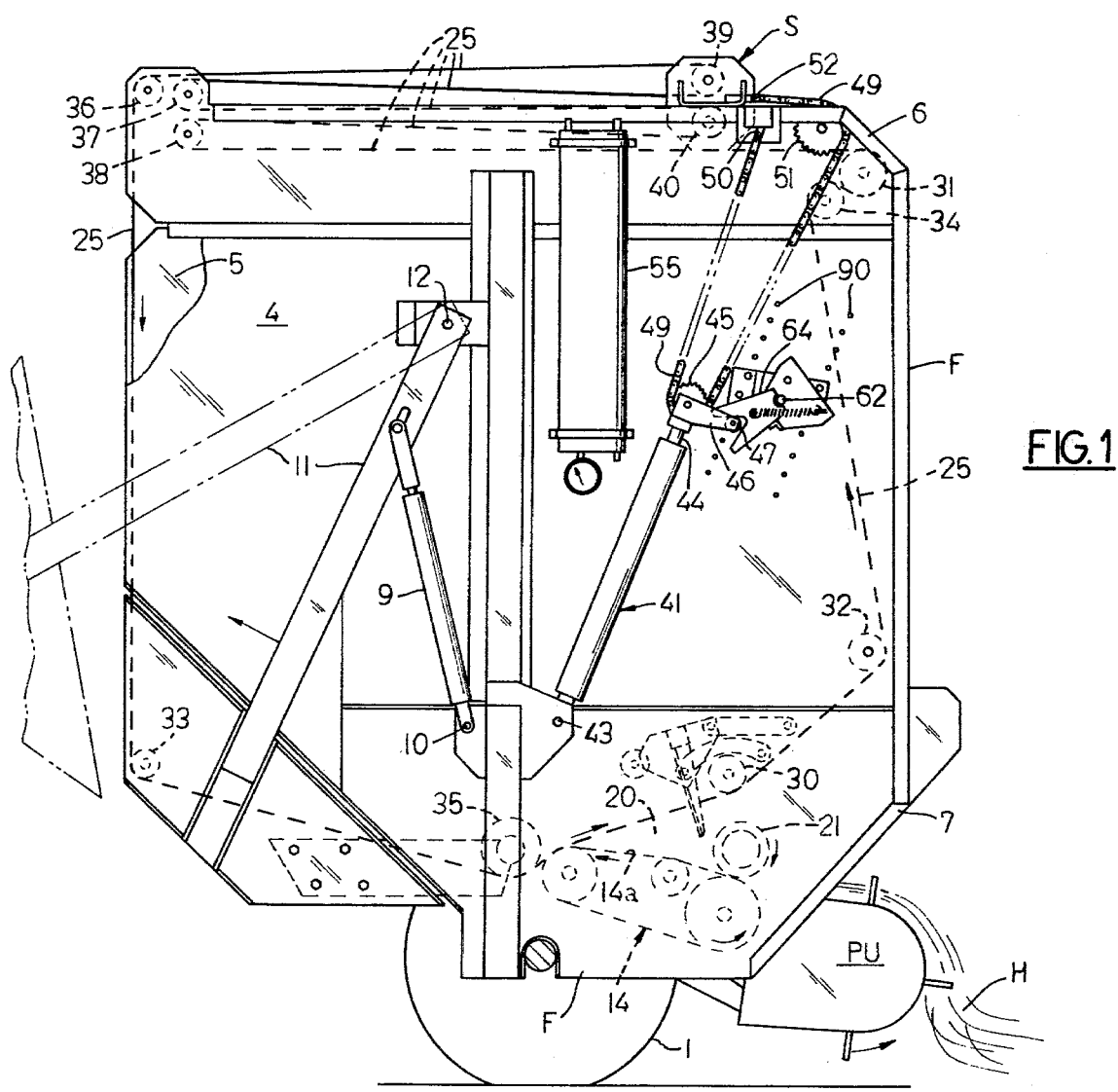
FIG. 1 is a right side elevational view of a rotary baler made in accordance with the present invention, certain parts being shown with dotted lines and certain other parts being removed for the sake of clarity in the drawings, the view showing the hydraulic control means at the initial reservoir pressure position and before bale forming has commenced.

A rotary crop pick-up mechanism PU which rotates about a horizontal transverse axis is suspended below the tongue from a forward position of the frame where it can be lowered into crop engaging position for delivery of the crop, such as hay H to the baling machine as indicated in FIG. 1.

The main frame of the machine includes a pair of vertically disposed and spaced apart side walls 4 and 5 which are held apart in parallel relationship to each other by cross members 6 and 7 of the frame. A pair of large hydraulic cylinders 9 are pivoted at 10 to the frame, one cylinder on each side of the machine, and are connected at their other ends to a frame member 11 so that extension of these hydraulic cylinders act to swing the rear end of the baler about the pivot point 12 to thereby open the rear end of the machine to discharge the completely formed bale, in the known manner.

Disposed between the side walls 4 and 5 is a conveyor assembly 14 which extends for the full width between the side walls and has an upper flight 14a which forms a conveying platform for receiving crop material H from the pick-up unit PU and moving it rearwardly into a bale forming zone 20 (FIG. 1). A feed or packer roll 21 is provided adjacent the front end of the conveyor assembly 14 for cooperation therewith and between which the crop material passes. Conveyor 14 is shown as an endless belt.

Figure 3:
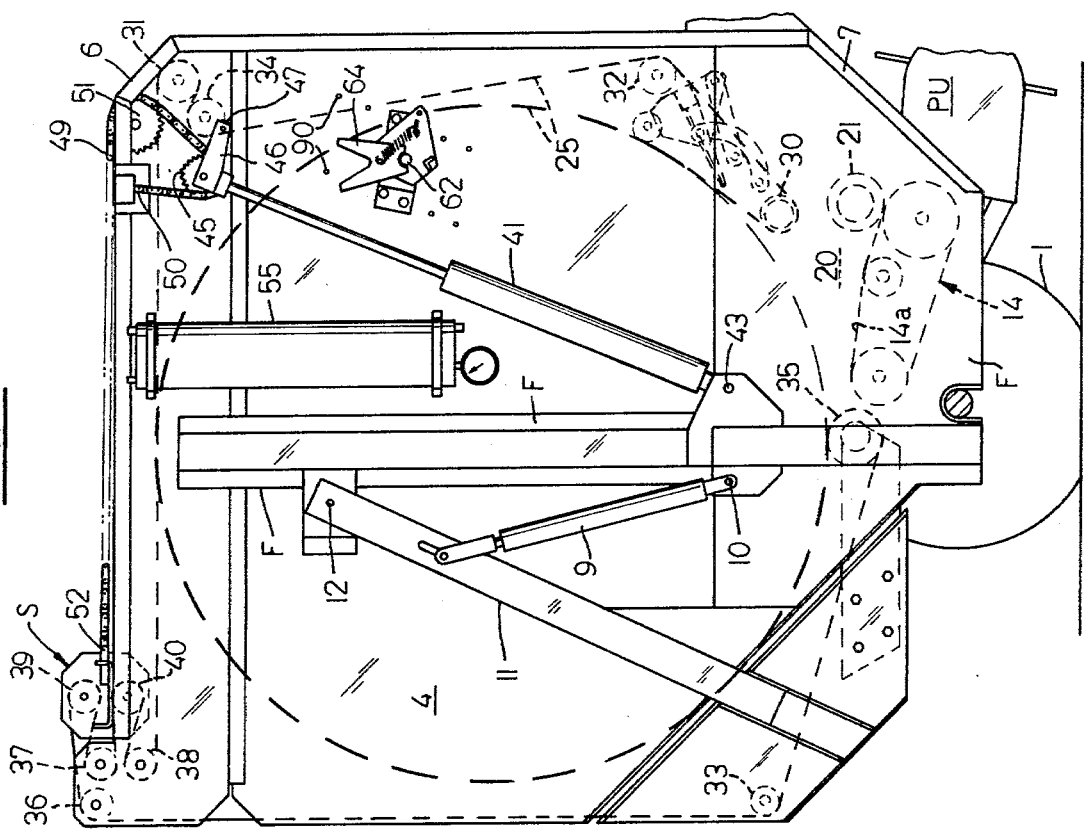
FIG. 3 is a view similar to FIG. 2, but showing the position of the parts when the bale has reached a diameter of about 60 inches and just prior to ejection of the bale.
Figure 2:
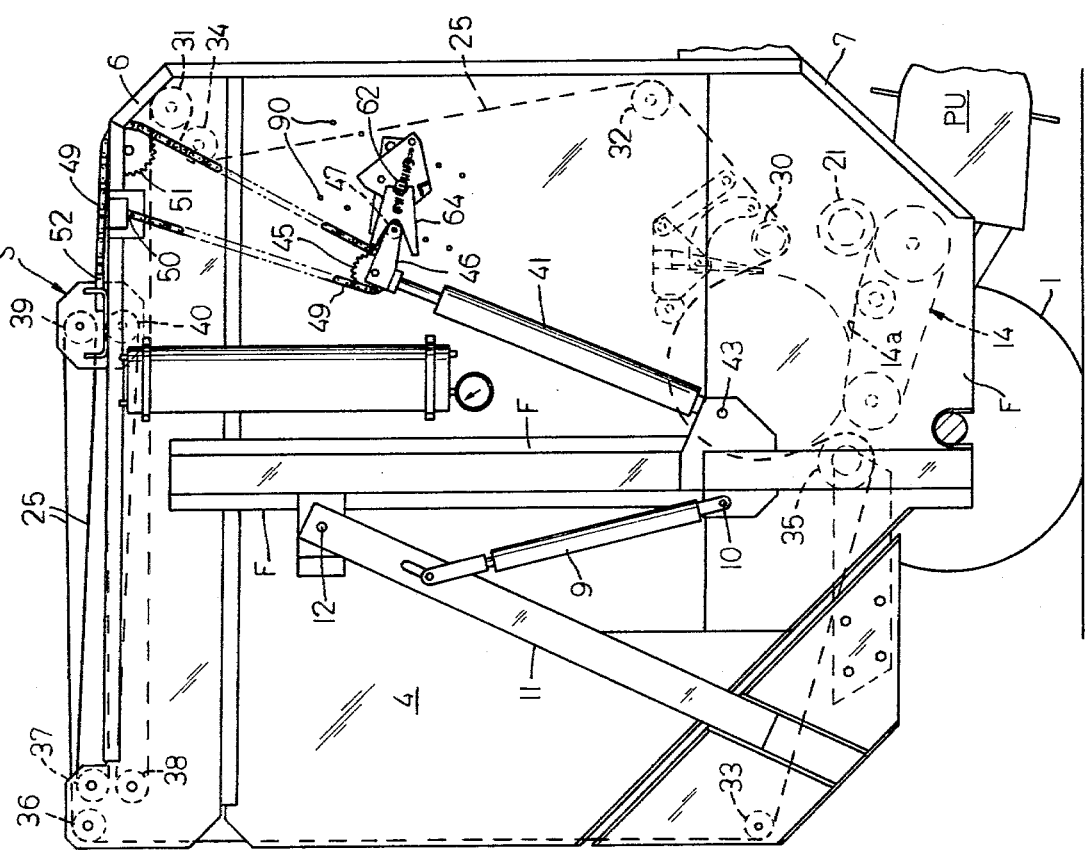
FIG. 2 is a view similar to FIG. 1, but showing the position of the hydraulic control means when a bale is approximately 20 inches in diameter as formed in the bale chamber.

A large endless upper compacting member 25 (comprised of a series of belts) is trained around rollers in the frame and the lower flight of this means or belt together with the conveyor 14 constitute cooperative means that defines the baling chamber 20. This compacting means which may be formed by endless belts or chains, is trained around lower drive rollers 30 and 32, an upper drive roller 31, idler rollers 33, 34, roller 35, tailgate rollers 36, 37 and 38, and also around the shuttle rollers 39 and 40, the latter two of which are journalled on the longitudinally movable shuttle S. The shuttle S is a shiftable means guided for fore and aft movement on top of the frame in the known manner and is in the forward position as shown in FIG. 1 when there is no bale being formed in the baling chamber 20. As the bale is formed and grows in size as shown in FIGS. 2 and 3, the shuttle moves rearwardly as shown in FIGS. 2 and 3 so as to provide sufficient compacting belt length to tightly surround the bale being formed and regulate the density of the bale.

ADJUSTABLE HYDRAULIC CONTROL MEANS FOR CONTROLLING THE BALE DENSITY

In accordance with the present invention, a hydraulic control means is provided for maintaining proper tension in the compacting belt and consequently insuring proper density of the bale being formed. It is desirable to be able to increase the tension in the compacting means or member 25 during the early stages of formation of the bale to insure the bale is formed with a tight core, or inner portion, which consequently results in good overall bale density. It is also desirable to be able to vary the density of the bale depending on crop types and other conditions encountered.

Figure 4:
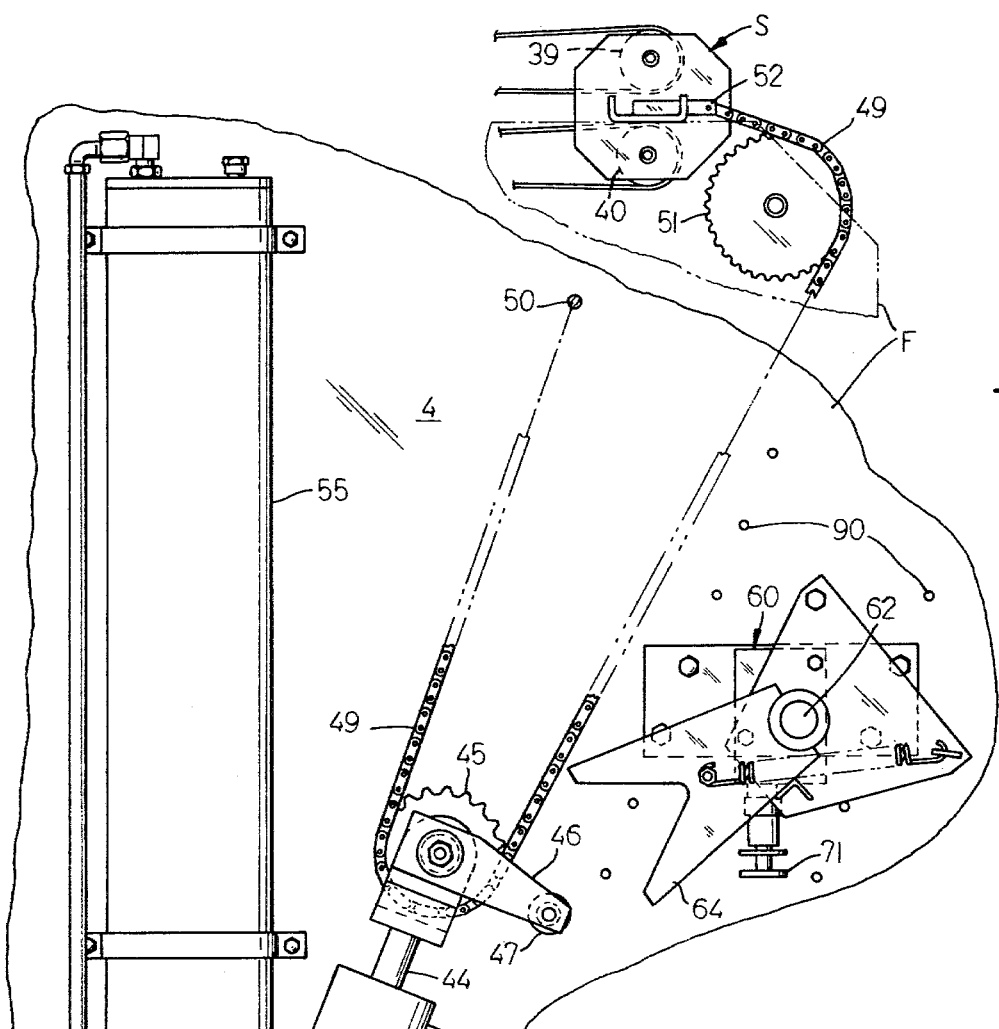
FIG. 4 is a fragmentary, enlarged view of the parts as shown in FIG. 1.

The control mechanism provided by the present invention includes hydraulic cylinder means in the form of extensible large hydraulic cylinders 41 and 42, one mounted on each side of the machine and pivoted at their lower, cylinder ends as at 43 to the frame of the machine. Referring to one of these cylinders 41, its piston 44 has a chain sprocket 45 rotatably mounted thereon by means of bracket 46. The outer end of the bracket 46 has a roller 47 journalled thereon (FIG. 4). Flexible connecting means in the form of a sprocket chain 49 extends around sprocket 45 and one of its ends is anchored at 50 to the machine frame. The sprocket chain 49 extends around a larger sprocket 51 journalled on the frame of the machine and the other end of the sprocket chain 52 is anchored on the shuttle 42. A similar sprocket and chain arrangement is provided for the cylinder 42 located on the other side of the machine. A reservoir 55 is mounted on the machine and contains hydraulic fluid such as oil in the lower portion thereof, while the upper portion of the reservoir contains air under pressure (FIG. 6), thus constituting an air-over-oil reservoir.

Figure 6:
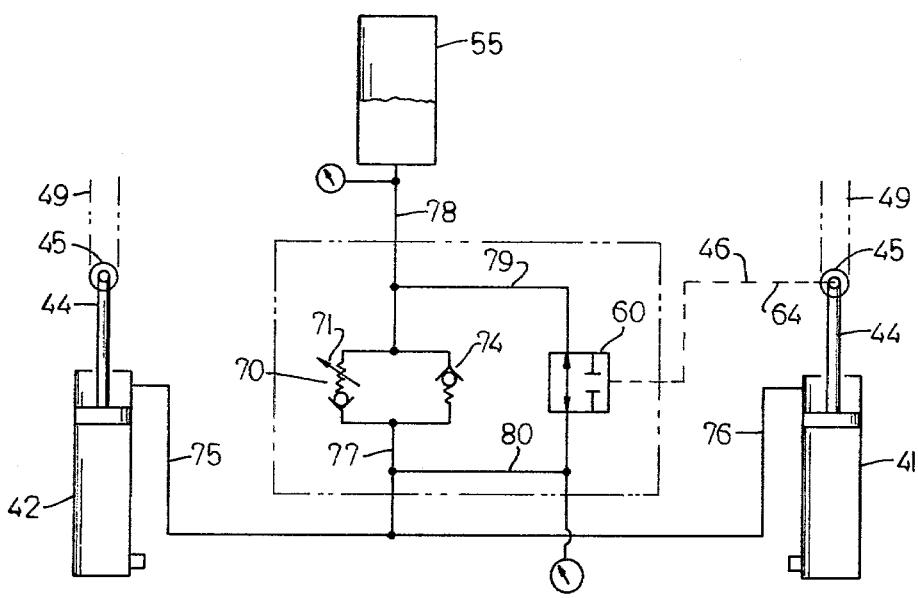
FIG. 6 is a schematic diagram of the hydraulic control circuit provided by the present invention.

The hydraulic control mechanism also includes an on-off valve in the form of a quarter-turn valve 60, shown clearly in FIGS. 6, 7 and 8. The valve 60 is a normally open valve as indicated in FIG. 6. This valve has an oscillatable valve member 62, the end of which extends therefrom and has a bifurcated arm 64 secured thereto.

Figure 5:
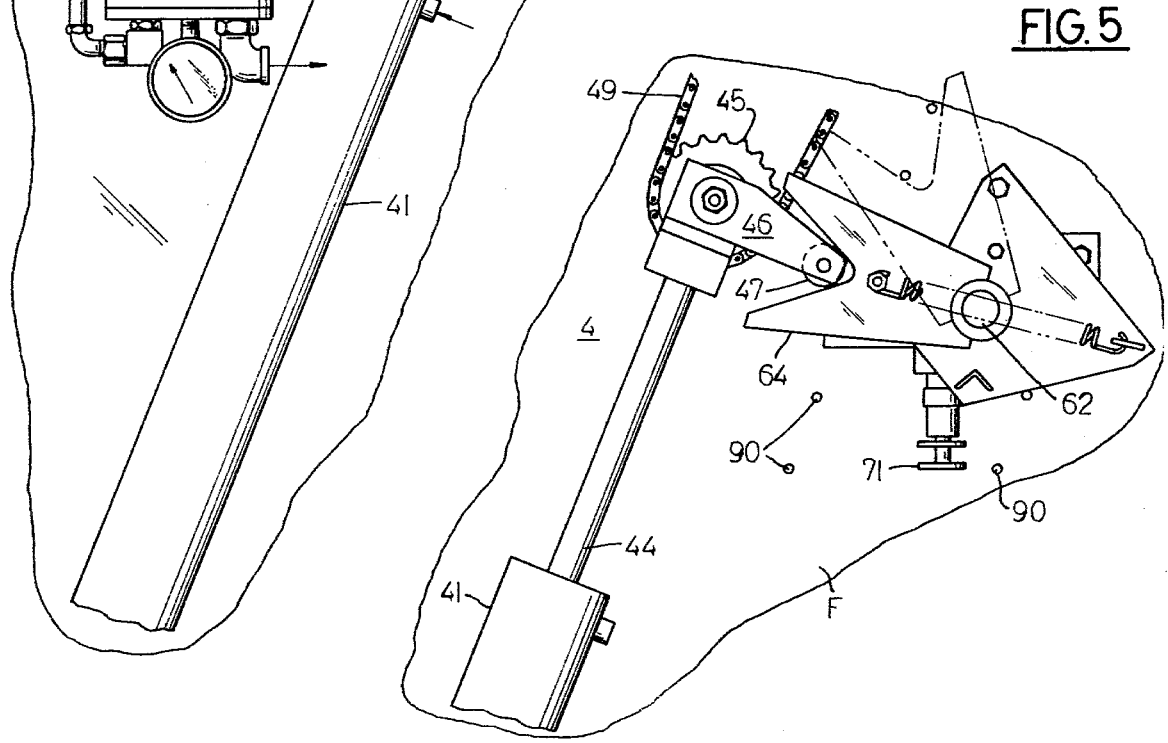
FIG. 5 is a view similar to FIG. 4 and showing the position in full line of parts of the hydraulic control means when the bale being formed has reached a diameter of about 20 inches and the hydraulic control valve is closed.

The bifurcated end of arm 64 is engageable by the roller 47 carried by the piston rod 44 when the cylinder 41 has been extended, from the initial position (FIG. 4) where the valve is open, to the partially extended positions shown in FIGS. 1, 2 and 5. Further extension of the rod then causes the valve member 62 to be further rotated, (FIG. 5) to cause the valve member 62 to move to the closed position.

The hydraulic control means also includes an adjustable relief valve 70 (FIG. 6) which can be set by the adjustable knob 71 (FIGS. 4–8) to thereby vary its relief setting from between 200 and 600 p.s.i. for example. The valve mechanism also includes a check valve 74 for low pressure relief which can be set for example at 10 p.s.i.

It will be noted that the cylinders 41 and 42 (FIG. 6) are in communication at their rod ends via lines 75 and 76, respectively, and common line 77 with the adjustable relief valve 70 and the check valve 74, which are in turn communicable via line 78 with the reservoir 55. The normally open quarter-turn valve 60 communicates with line 78 via line 79 and with line 77 via line 80.

In operation, before the bale starts to form, the cylinders 41, 42 are in the position shown in FIG. 4. At this stage, pressure fluid (oil) passes through the open valve 60. With valve 60 open, air pressure acting on the oil in the pressurized reservoir 55 acts directly on the rod end of the cylinders 41, 42 and produces a low level of tension to the compacting belts during this critical initial bale starting phase of the baling cycle.

When the bale formation commences, and the bale starts to rotate and reaches a predetermined size (say 20 inches in diameter), valve 60 is closed (FIGS. 2 and 5), and then oil from the extending cylinders 40, 41 is forced through the adjustable relief valve 70 at pressures that are higher than the air pressure from the reservoir. This results in high compacting belt tension while the rotating bale is relatively small and consequently results in increased bale density over conventional tensioning means.

In this manner, the means to actuate the adjustable relief valve 70 is governed by the extended cylinder length which is directly related to the bale size. The adjustable relief valve is set at a higher pressure setting than is the reservoir and senses the difference in pressure between the reservoir and the rod end of the cylinders, and thereby the flow of pressure oil and the pressure are controlled primarily by the adjustable relief function of the valve. In other words, the relief valve produces a pressure different between the oil in the reservoir and oil in the cylinder rod ends.

Other means which are related to bale size may also be used to actuate the valve at the appropriate time, such as the shuttle S or other means contacted by the bale.

As the bale continues to grow, the shuttle S travels rearwardly along the top of the baler, thereby causing the hydraulic cylinders 41 and 42 to further extend. When the bale has reached maximum size (FIG. 3) and the shuttle has moved to the fully rearward position, the hydraulic cylinders are fully extended.

When the bale has thus been fully formed and wrapped by means (not shown), the baler gate is opened by the other hydraulic cylinders 9, operated by the tractor hydraulics (not shown).

Once the bale has been ejected there is no force exerted to extend the cylinders 41 and 42 and the pressure of the reservoir 55 acting through the reverse flow function of the valve 74, which is set at about 10 p.s.i., forces the cylinders to retract, thus moving the shuttle S forwardly. On the return stroke of the cylinders 41, 42, the quarter-turn valve 60 is opened for the next cycle.

The graph shown in FIG. 9 illustrates the relationship between the diameter of the bale, or the shuttle travel, and the belt tension, that is, the hydraulic cylinder force as compared with the reservoir pressure and various settings of the adjustable relief valve.

It can be seen that as a bale is first being formed in the critical stage, up to 20 inches diameter for example, the belt tension is low. Then, depending on the position of the valve means on the machine, when the movement of the cylinder means trips the valve 60 closed and the oil being expelled from cylinders 41 and 42 is forced through the adjustable relief valve 70, the belt tension increases dramatically and immediately to the setting of the adjustable relief valve. After that, the high belt tension is maintained and increases more slowly as the bale grows to the finished size and the continuing expelled oil from the cylinders 41 and 42 further fills the reservoir 55 and increases its pressure.

By means of the present invention, an easily adjustable hydraulic control means is provided for accurately and conveniently controlling density of the bale, and insures that high compacting belt tension is provided during early stages of bale formation. By using the air over oil arrangement, in a self-contained and closed hydraulic circuit, the pressure force between the two sides is identical because of the parallel hydraulic circuit as shown in FIG. 6.

The valve assembly can be vertically shifted on the baler by means of the plurality of sets of holes 90 (FIG. 1). By this adjustable positioning of the valve assembly, the valve is engagable by movement of the cylinder rods at a desired size of bale diameter. The hydraulic control means provided by the present invention utilizes much less space on the machine than would otherwise be required, for example, by large, bulky and heavy tension springs that would be necessary to perform equivalent functions.

We claim:

1. A rotary baler for forming cylindrical bales of crop material comprising, means for transporting said baler over the crop material to be baled, a pick-up mechanism for feeding the crop to the baler, cooperative means carried by the baler defining a bale forming zone for receiving and rolling crop material and in which zone a bale can grow in diameter, said cooperative means including a tensioned compacting endless member which is continuously wrapped around the growing bale to provide bale density, shiftable means mounted on said baler and connected with said compacting member whereby shifting of said means permits said compacting member to be continuously wrapped around the bale being formed, and hydraulic control means mounted on the baler and connected to said shiftable means for maintaining tension in said compacting member to insure proper bale density, said hydraulic control means including an extensible hydraulic cylinder means and a hydraulic valve means actuated by said cylinder means during an initial stage of bale formation to cause increased tension in said compacting member during the final stage of bale formation.

2. The baler set forth in claim 1 further characterized in that said hydraulic control means includes connecting means between said cylinder means and said shiftable means whereby as said shiftable means is shifted as the bale being formed increases in size said cylinder means is extended, a pressure fluid reservoir; fluid circuit means connecting said reservoir, said cylinder means and said valve means whereby during initial stages of bale formation said valve means permits pressure fluid in said reservoir to act directly on said cylinder means to retard their extension, and when the bale being formed reaches a predetermined size and said cylinder means is extended sufficiently to actuate said valve means, increased fluid pressure acts on said cylinder means to thereby cause increased tension in said compacting member.

3. The baler as described in claim 2 further characterized in that said valve means includes an on-off valve which is actuated by movement of said cylinder means, and an adjustable relief valve provides increased fluid pressure for acting on said cylinder means.

4. The baler set forth in claim 2 further characterized in that said connecting means comprises sprocket and chain means.

5. The baler set forth in claim 3 further characterized in that said connecting means comprises sprocket and chain means.

6. A machine for forming a cylindrical bale of cut crop material comprising; a mobile frame, a conveyor belt movably supported on said frame and including an upper belt flight movable rearwardly relative to said frame, means on said frame for picking up and delivering material to be baled to said conveyor belt, compacting belt means movably supported on said frame and being guided to form a lower belt flight movable in a forward direction relative to said frame, said upper and lower belt flights thereby moving in opposite directions for rotating crop material therebetween to form a rotating cylindrical bale with its bottom surface portion moving rearwardly, and hydraulic control means yieldably resisting extension of said upper belt flight and maintaining the latter in contact with the surface of the bale being formed, said hydraulic control means including an extensible hydraulic cylinder means and a hydraulic valve means actuated by said cylinder means during an initial stage of bale formation to cause increased tension in said compacting member during the final stage of bale formation.

7. The machine set forth in claim 6 further characterized in that said hydraulic control means includes flexible connecting means between said cylinder means and said compacting belt means whereby as said compacting belt means is drawn around the bale as the bale being formed increases in size, said cylinder means is extended, a pressure fluid reservoir; fluid circuit means connecting said reservoir, said cylinder means and said valve means whereby during initial stages of bale formation said valve means permits pressure fluid in said reservoir to act directly on said cylinder means to retard their extension, and when the bale being formed reaches a predetermined size and said cylinder means is extended sufficiently to actuate said valve means, increased fluid pressure acts on said cylinder means to thereby cause increased tension in said compacting belt.

8. The machine as described in claim 7 further characterized in that said valve means includes an on-off valve which is actuated by movement of said cylinder means, and an adjustable relief valve provides increased fluid pressure for acting on said cylinder means.

9. The machine set forth in claim 7 further characterized in that said flexible connecting means comprises sprocket and chain means.

10. The machine set forth in claim 8 further characterized in that said flexible connecting means comprises sprocket and chain means.

11. A rotary baler for forming cylindrical bales of crop material comprising, means for transporting said baler over the crop material to be baled, a pick-up mechanism for feeding the crop to the baler, cooperative means carried by the baler defining a bale forming zone for receiving and rolling crop material and in which zone a bale can grow in diameter, said cooperative means including a tensioned compacting endless member which is continuously wrapped around the growing bale to provide bale density, shiftable means mounted on said baler and connected with said compacting member whereby shifting of the shiftable means permits said compacting member to be continuously wrapped around the bale being formed, hydraulic control means including a valve and mounted on the baler and connected with said shiftable means for maintaining tension in said compacting member to insure proper bale density, and actuating means movable in response to the bale being formed reaching a predetermined size and before said bale has reached its full diameter, said hydraulic control valve means being actuated by said actuating means to thereby cause said hydraulic control means to apply greater tension to said compacting member during the remaining portion of bale diameter increase.

12. The machine set forth in claim 1 including means for adjustably mounting said valve means on said machine to vary the point during bale formation at which said cylinder means actuates said valve means.

13. The machine set forth in claim 6 including means for adjustably mounting said valve means on said machine to vary the point during bale formation at which said cylinder means actuates said valve means.

* * * * *